UNITED STATES PATENT OFFICE.

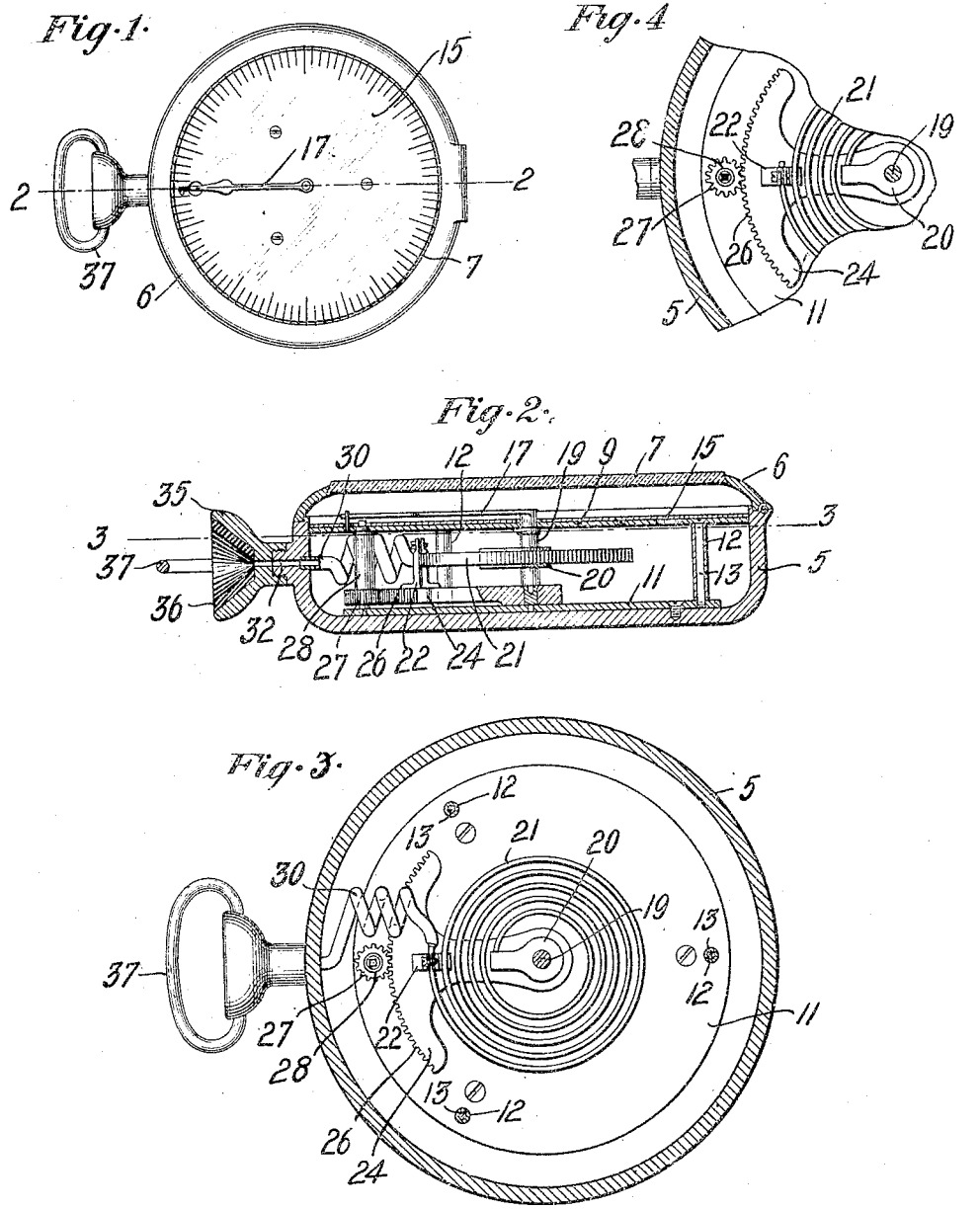

EDGAR H. BRISTOL AND WATSON E. GOODYEAR, OF NAUGATUCK, CONNECTICUT, ASSIGNORS, BY MESNE ASSIGNMENTS, TO THE FOXBORO COMPANY, OF FOXBORO, MASSACHUSETTS, A CORPORATION OF MASSACHUSETTS.

MEASURING OR CONTROLLING INSTRUMENT.

1,164,573.  Specification of Letters Patent.  Patented Dec. 14, 1915.

Application filed May 13, 1908. Serial No. 432,564.

*To all whom it may concern:*

Be it known that we, EDGAR H. BRISTOL and WATSON E. GOODYEAR, both citizens of the United States, and residents of Naugatuck, in the county of New Haven and State of Connecticut, have invented an Improvement in Measuring or Controlling Instruments, (Case I,) of which the following description, in connection with the accompanying drawings, is a specification, like letters on the drawings representing like parts.

This invention relates to that class of instruments wherein one or more elements responsive to changes in temperature, pressure or the like, is or are used to perform some desired indicating, recording or other office.

To illustrate one practicable mode of utilizing the features of the invention the same will be described herein as embodied in a pressure responsive instrument constructed to govern the movement of a suitable index over a dial.

It is to be understood that the invention is not limited to the specific construction and organization illustrated in the drawings; nor to the specific operation and use described herein for exemplification.

In the drawings,—Figure 1 is a face view of a convenient watch case form of pressure gage embodying the invention; Fig. 2 is a diametrical section on an enlarged scale of the instrument shown in Fig. 1; Fig. 3 is a horizontal section on the line 3—3 of Fig. 2; and Fig. 4 is a detail section partly broken away, corresponding to the section of Fig. 3, of a modified form of instrument hereinafter referred to.

Referring to the drawings, the instrument is there shown in condensed form suitable for a pocket instrument. The same may be inclosed in a suitable case 5 having a lid 6, provided with a transparent face 7. The operating parts of the instrument may be mounted conveniently upon and between plates 9 and 11, spaced apart by columns 12 having screws 13 projected therethrough to hold the plates 9 and 11 together. A dial 15 rests upon and may be secured to the upper plate 9. This dial may be graduated in any suitable or desired manner. An index 17 overlying the face of the dial 15 may be rigidly mounted at the upper end of a shaft 19, journaled at its upper end in the frame plate 9 and stepped or otherwise journaled at its lower end in a stud 19$^a$ mounted upon the lower frame plate 11. The specific manner of mounting the shaft 19 is non-essential and merely exemplifies a preferred arrangement whereby the shaft may be maintained in suitable axial relation to the dial 15. Preferably rigidly fixed to the shaft near its middle is an arm 20 affording a convenient means of communicating to the shaft 19 the governance of the responsive element of the instrument. A practicable form of responsive element consists of a preferably flat tube 21 wound with many convolutions, in a flat spiral. The tube is preferred to be very small in cross section and to have its walls very thin, so as to be extremely delicate and sensitive in its response to pressure, temperature or the like. The outer end of the tube 21 may be so mounted as to be adjustable; and this may be effected by supporting the end of the tube between clamping devices 22, which when closed may grip the tube sufficiently to hold it relatively stationary. As will appear to those skilled in the art such an adjustment permits the clamping device 22 to be loosened and the tube 21 drawn therethrough so as to vary if desired the length of tube intervening between the part held by the clamping members 22 and the part connected to the arm 20 or other working device. By thus varying the length of the tube 21 the amplitude of its responsive movement may be varied. This affords convenient means for standardizing the instrument by reference to another of known accuracy.

In an instrument of the character described, the mechanism may be injured or distorted in some way so that the index fails to register (for instance) zero under proper conditions, rendering it desirable that a readjustment be made. It may not be expedient to change the prevailing relations between the responsive element and the index, but instead to shift the entire responsive system, so that the same will be in position and condition to register zero appropriately while at the same time the parts remain suitably correlated to make the indications under varying conditions. This result may be attained by adjustably mounting the responsive element, as by having the clamping members 22 mounted upon a movable base plate 24. Said base plate 24 may be pivoted on the stud 19ª (Fig. 2) preferably coaxially with the index 17. A part of the base plate 24 may be toothed to supply a sector gear 26 engaging a pinion 27 on shaft 28 journaled in the frame plates 9 and 11. The upper end of the shaft 28 may project through an aperture in the plate 9 and dial 15 and may be squared for engagement with a key for turning the shaft and adjusting the base plate 24 and the parts connected thereto. Preferably the upper and lower ends of the shaft 28 are snugly engaged between the frame plates 9 and 11, so as to exert considerable friction upon the shaft and prevent its being turned accidentally while permitting it to be positively turned by key when it is desired to effect a new adjustment.

If, for the purposes of any particular instrument, it be desired that some communication be had between the interior of the tube 21 and some source of pressure, fluid control, or the like exterior to the casing 5,—a flexible connection 30, as a flexible pipe of any suitable material, may be soldered or otherwise attached to the outer end of tube 21 and interposed between the tube 21 and a port 32 in the casing 5. The provision of such a flexible connection 30 permits a responsive mechanism, such as is shown in the drawings, to be used in a casing of any desired size and suitably located therein while the flexible connection permits ready access to the responsive mechanism from the exterior of the tube. Thus, for example, it is rendered practicable to use responsive mechanism of a given size and type to suit varying conditions in instruments having larger or smaller dials, charts or the like. The port 32 (Fig. 2) may communicate with any practicable sort of socket or the like, permitting the instrument to be connected up with a source of control. To suit the purposes of the specific illustrative instrument, of the watch case type, a socket 35 may be provided in a stem of the casing 5 and said socket may be provided with a frusto-conical rubber gasket 36 or any suitable means contributing to give tight closure between the socket and a pipe, for instance, from the source of control.

A bail 37 may be provided to facilitate handling the instrument and said bail may be appropriately mounted in or connected to the socket stem.

It will be apparent to those skilled in the art that such an instrument as has been described is of wide utility and may serve various different purposes. For example, it is not essential that the responsive member (exemplified by the tube 21) be in communication with the exterior of the casing 5. On the contrary the instrument may be independent of external control, as by having the outer end of the tube 21 (Fig. 4) sealed. For instance, the tube sealed at both ends may be filled with a fluid (as alcohol or the like) and so arranged the tube may serve as a thermo-responsive member for thermometric purposes. The instrument may also be made responsive to barometric conditions, as by creating a partial vacuum in the tube 21 or its equivalent or substitute and then sealing both ends to render the same highly sensitive to variations in external fluid pressure.

The several features of adjustment heretofore described are of advantage considered both individually and collectively. For instance, by adjusting the outer end of the tube in relation to the clamping members 22 the effective length of the tube may be varied or adjusted; and if this adjustment have the effect of disturbing desired relations between index 17 and dial 15 (or their substitutes) the same may be compensated by the adjustment of the base plate 24. Also the latter adjustment may be of utility independently of the tube length, and vice versa.

In addition to the specific utilities of an instrument embodying this invention as set forth above, the invention is to be considered applicable to any uses to which it may be practicably applied, except, of course, where otherwise indicated by the context of the claims; also the specific construction and organization disclosed for illustration may be variously changed and modified, as will appear to those skilled in the art. It is not indispensable that all the features of the invention be used conjointly, since they may be used to advantage separately. For convenience, in some of the subjoined claims the expression "working device" will be used to designate a governed or actuated element of the instrument, such, for example, as is exemplified by the shaft 19 or index 17.

Claims:

1. In an instrument of the class described, the combination of a flexible delicate fluid-containing fluid responsive member of minute cross section having one end sealed and the other end serving as an entrance for the fluid; movable means supporting the sealed end of the responsive member and having its movement governed thereby; normally stationary adjustable means to support the entrance end of the responsive member; and means to vary the effective length of the responsive member by shifting said adjustable means with relation to said entrance end.

2. In an instrument of the class described, the combination of a delicate flexible responsive member comprising a number of convolutions of minute cross section; a shaft connected to and supporting one end of said responsive member and governed by the response of said member; an index mounted on said shaft; dial means to coöperate with the index; clamping means to engage the other end of the responsive member, permitting the latter to be adjusted in relation to the clamping means; a base plate supporting the clamping means and movable to adjust the same; means accessible from the face of the dial to adjust said base plate; a flexible connection communicating with the responsive member; a casing for the whole; and socket means on the exterior of the casing and communicating with said flexible connection.

3. In an instrument of the class described, the combination of a flexible responsive member comprising a plurality of convolutions of minute cross section; a shaft connected to and supporting one end of said responsive member and governed by the response of said member; an index mounted on said shaft; dial means to coöperate with the index; means to support the other end of the responsive member, permitting the latter to be adjusted in relation thereto; means to adjust said supporting means and the responsive member together; a flexible connection communicating with the responsive member; a casing for the whole; and socket means on the exterior of the casing communicating with said flexible connection.

4. In an instrument of the class described, the combination of a flexible responsive member comprising a number of convolutions of minute cross section; a shaft connected to and supporting one end of said responsive member and governed thereby; means to support the other end of the responsive member; a flexible connection communicating with the responsive member; a casing for the whole; and socket means on the exterior of the casing and communicating with said flexible connection.

5. In an instrument of the class described, the combination of a flexible fluid-containing fluid responsive member comprising a number of convolutions of minute cross section having one end sealed and the other end serving as an entrance for the fluid; a shaft connected to and supporting the sealed end of said responsive member and governed thereby; means to support the entrance end of the responsive member; and means to adjust said supporting means so as to shift the point of support along said member.

6. In an instrument of the class described, the combination of a working device; a fluid-containing responsive member to govern the working device; means to vary the amplitude of response of said member by adjusting said member while preserving its relation to the working device.

7. In an instrument of the class described, the combination of a working device; a tubular fluid-containing responsive member to govern the working device, and having an open end; means to adjust said open end; a casing having a port therein; and a flexible connection intermediate said port and the open end of the responsive member.

8. In an instrument of the class described, the combination of a working device; a curved fluid containing fluid responsive member having one end arranged to govern the working device and an open end, clamping means for adjustable engagement with said open end to vary the effective length of said responsive member, and means for shifting said clamping means along said responsive member.

9. In an instrument of the class described, the combination of a working device; a responsive member to govern the same; said member having one end sealed and the other end serving as an entrance for the fluid; means to confine the movement of the sealed end of the responsive device to a circular path for governing the working device; and means to hold the entrance end of the responsive member adjustably stationary.

10. In an instrument of the class described, the combination of a flexible responsive member; a shaft connected to and supporting one end of said responsive member and governed by the response of said member; an index mounted on said shaft; dial means to coöperate with the index; means to support the other end of the responsive member, permitting the latter to be adjusted in relation thereto; means to adjust said supporting means and the responsive member together; a flexible connection communicating with the responsive member; a casing for the whole; and socket means on the exterior of the casing communicating with said flexible connection.

11. In an instrument of the class described, the combination of a flexible responsive member; a shaft connected to and supporting one end of said responsive member and governed thereby; means to support the other end of the responsive member; a flexible connection communicating with the responsive member; a casing for the whole; and socket means on the exterior of the casing and communicating with said flexib' connection.

In testimony whereof, we have signed o names to this specification, in the presen of two subscribing witnesses.

EDGAR H. BRISTOL.
WATSON E. GOODYEAR.

Witnesses:
BENNETT B. BRISTOL,
IRVING W. REYNOLDS.